US010647523B2

United States Patent
Sigrist

(10) Patent No.: US 10,647,523 B2
(45) Date of Patent: May 12, 2020

(54) APPLIANCE FOR CHARGING TRANSPORT POCKETS

(71) Applicant: Ferag AG, Hinwil (CH)

(72) Inventor: Sergio Sigrist, Hinwil (CH)

(73) Assignee: FERAG AG, Hinwil (CH)

( * ) Notice: Subject to any disclaimer, the term of this patent is extended or adjusted under 35 U.S.C. 154(b) by 0 days.

(21) Appl. No.: 15/778,315

(22) PCT Filed: Nov. 23, 2016

(86) PCT No.: PCT/CH2016/000148
§ 371 (c)(1),
(2) Date: May 23, 2018

(87) PCT Pub. No.: WO2017/088078
PCT Pub. Date: Jun. 1, 2017

(65) Prior Publication Data
US 2018/0354728 A1    Dec. 13, 2018

(30) Foreign Application Priority Data

Nov. 25, 2015  (CH) ..................................... 01721/15
Oct. 27, 2016  (CH) ..................................... 01438/16

(51) Int. Cl.
*B65G 47/61*    (2006.01)
*B65G 19/02*    (2006.01)
(Continued)

(52) U.S. Cl.
CPC ............ *B65G 47/61* (2013.01); *B65G 9/002* (2013.01); *B65G 9/004* (2013.01); *B65G 19/025* (2013.01);
(Continued)

(58) Field of Classification Search
CPC ........ B65G 47/61; B65G 9/002; B65G 17/20; B65D 88/15
(Continued)

(56) References Cited

U.S. PATENT DOCUMENTS

| 748,576 A | 1/1904 | Bivert |
| 5,125,500 A * | 6/1992 | Cailbault ................ B07C 3/082 |
| | | 198/470.1 |

(Continued)

FOREIGN PATENT DOCUMENTS

| DE | 397192 | 6/1924 |
| DE | 692888 | 6/1940 |

(Continued)

OTHER PUBLICATIONS

Switzerland Search Report dated Feb. 12, 2016, Application No. 01721/15, 2 pages.
(Continued)

*Primary Examiner* — Gene O Crawford
*Assistant Examiner* — Lester Ill Rushin
(74) *Attorney, Agent, or Firm* — Rankin, Hill & Clark LLP

(57) ABSTRACT

A transport pocket for the suspended transport of a transport item along a conveying direction via a suspended conveying device includes a pocket rear wall and a pouch wall that, together with the pocket rear wall, form a receiving compartment for the transport item. The receiving compartment forms a receiving opening for the transport item and is designed to assume an open position and a space-saving compact position. A fastener connects the transport pocket to a conveying member of the suspended conveying device. A cam element, which can interact with an activation device of the suspended conveying device, which is designed as a cam guide, and via which cam guide the receiving compartment
(Continued)

can be moved into the open position or be held in this. The at least one cam element is arranged on the pouch wall of the transport pocket.

18 Claims, 10 Drawing Sheets

(51) Int. Cl.
 *B65G 9/00* (2006.01)
 *B65B 25/20* (2006.01)
(52) U.S. Cl.
 CPC ...... *B65B 25/20* (2013.01); *B65G 2201/0229* (2013.01)
(58) Field of Classification Search
 USPC .......................................................... 198/703
 See application file for complete search history.

(56) References Cited

U.S. PATENT DOCUMENTS

| | | |
|---|---|---|
| 2014/0284179 A1 | 9/2014 | Janzen |
| 2019/0071219 A1* | 3/2019 | Ueda ..................... B65G 17/20 |

FOREIGN PATENT DOCUMENTS

| | | |
|---|---|---|
| DE | 103 54 419 | 6/2005 |
| DE | 10 2004 018 569 A1 | 11/2005 |
| DE | 10 2008 061685 | 6/2010 |
| DE | 10 2012 018 925 | 3/2014 |
| DE | 10 2013 205 170 | 9/2014 |
| DE | 10 2004 018 569 B4 | 9/2016 |
| EP | 0 638 501 | 2/1995 |
| EP | 1 420 105 | 5/2004 |
| EP | 2 418 160 | 2/2012 |
| WO | 90/03853 | 4/1990 |
| WO | 2014/044601 | 3/2014 |

OTHER PUBLICATIONS

Switzerland Search Report dated Dec. 28, 2016, Application No. 01438/16, 2 pages.

English translation of International Preliminary Report on Patentability dated May 29, 2018 (May 29, 2018), Application No. PCT/CH2016/000148, 7 pages.

* cited by examiner

APPLIANCE FOR CHARGING TRANSPORT POCKETS

BACKGROUND OF THE INVENTION

Field of the Invention

The invention concerns the field of transport technology and conveying technology, in particular intra-logistics.

Description of Related Art

In automated warehouses, vast production facilities and very generally concerning the transport of goods, there exists the need to receive the items (goods) in suitable receptacles, to then convey these receptacles further, for example via a suspended conveying device, and to intermediately store them or to transport them to their designated location and to unload them again there.

Hence, it is known from the state of the art to apply suspended conveying devices with transport pockets for the transport of the goods.

The published document DE 10 2004 018 569 A1 for example describes a suspended conveyor with a plurality of collecting pockets that can be folded together and that are for receiving and the sorting collecting of objects, in particular pieces of clothing. The collecting pocket includes a frame mount and a pocket pouch that is suspended on the frame mount. The collecting pocket is suspended on the suspended conveyor via a hook that is attached to the frame mount.

The advantage of transport pockets lies in the fact that they are designed in a flexible manner. The receiving compartment, i.e. the pocket pouch, can be compressed or pressed together by way of this, e.g. by way of folding together. In this manner, the transport pockets permit goods logistics that are space-saving compared, for example, to rigid crates. Empty transport pockets with a pressed-together receiving compartment, i.e. pocket pouch can therefore be stored and conveyed in a space-saving manner. The receiving compartments do not need to be expanded to the extent that they take up space, until the goods are transported or stored.

Suspended conveying systems with transport pockets however have the disadvantage that it is difficult to reliably charge the transport pockets with goods in an automated process. Amongst other things, this is due to the fact that the pocket opening or receiving opening, through which the transport item must be inserted into the receiving compartment in a targeted manner, only has a limited size. As a rule, the transport pockets are moreover conveyed in a freely swinging or pivoting manner in suspended conveying systems, and this likewise renders the transfer of goods into the transfer pockets more difficult. I.e., additional measures are necessary for stabilising the transport pockets.

The published document DE 10 2008 061 685 A1 describes a loading station for transport pockets that are conveyed in a suspended conveying facility. The loading station includes an upper feed rail for the transport pockets, a perpendicular conveyor which is subsequent to the feed rail, for feeding the transport pockets into a lower loading position, a device for opening the transport pockets in the loading position and a lower lead-away rail, which is subsequent to the perpendicular conveyor, for leading away the transport pockets out of the loading position.

Known loading stations or the associated transport pockets have the disadvantage that these often have a complicated construction and the loading stations have a complex process course, for the reasons mentioned above. The loading procedure is accordingly awkward. This results in the loading speed being unsatisfactory.

SUMMARY OF THE INVENTION

It is therefore an object to suggest an appliance for charging transport pockets with a transport item, the appliance making do without additional devices as much as possible.

The appliance should further permit a reliable charging of the transport pockets, in particular also in the case of comparatively small receiving openings.

The appliance should moreover permit a charging of the transport pockets at a comparatively high speed.

It is moreover an object to suggest a transport pocket as well as a suspended conveying device with the associated method, which permit a simple opening of the transport pockets for the purpose of charging the transport pockets with a transport item. The construction of the transport pocket should herein be as simple as possible.

The appliance according to the invention is characterised in that the at least one cam element is arranged on the pouch wall of the transport pocket.

A further aspect relates to an appliance for charging transport pockets with a transport item. The appliance includes a feed device for feeding the transport item into a transfer zone as well as a suspended conveying device with a plurality of transport pockets, which are arranged one after the other in the conveying direction, for taking over the transport item in the transfer zone and for conveying away the charged transport pockets.

The transport pockets each form a receiving compartment for the transport item as well as a pocket rear wall and are fastened on a conveying member of the suspended conveying device, which is to say connected to this.

A method for charging transport pockets with a transport item by way of the mentioned appliance is also counted as belonging to this aspect, wherein the transport item is fed to the transfer zone by way of the feed device and is transferred into the receiving compartments of the transport pockets, which are fed to the transfer zone by the suspended conveying device.

According to this aspect, the design of the feed device and of the suspended conveying device and their arrangement relative to one another is such that the transport pockets are moved through the transfer zone in a lying formation and in a transfer conveying direction, and the transport item, by way of the feed device, is transferred into the transfer zone essentially in the transfer conveying direction, in particular in the transfer conveying direction, of the transport pockets, and in a delivery region is delivered from above, in particular by way of gravity assistance, to the transport pockets, which are moved through the transfer zone below the feed device in the transfer zone.

Essentially in the transfer conveying direction means that the two conveying directions enclose an angle to one another of less than 45° (angle degrees), in particular of less than 20°.

According to a further development of the transport pocket, in the open position of the transport pocket, the pocket rear wall forms a rear wall section, which is extended beyond the receiving compartment.

In the transfer zone, the extended rear wall section in particular forms a support surface (rest surface) for the transferred transport item, which is to be received into the receiving compartment of the transport pocket.

In particular, the receiving compartment forms a receiving opening for the transport item.

In particular, in the open position of the transport pocket, the rear wall section is extended beyond the receiving opening.

In particular, the transport pocket includes a pouch wall, which, together with the pocket rear wall, forms the receiving compartment for the transport item. In particular, the pouch wall is connected to the pocket rear wall.

In the transfer zone, the pouch wall in particular forms a support surface for the transport item that is to be received into the receiving compartment of a following transport pocket.

The transport pockets are each connected to the conveying member of the suspended conveying device in particular via a fastening means.

In the transfer zone, the suspended conveying device in particular forms a pocket support (pocket rest), on which the transport pockets lie in the transfer zone. In particular, the transport pockets lie on the pocket support in a manner such that the transport pockets and in particular their extended rear wall section or the pouch wall forms a support surface for the transport item that is to be received by the receiving compartment of the transport pocket.

The transfer zone defines that conveying zone in the appliance, in which the transport items are transferred, i.e. delivered or released, from the feed device to the suspended conveying device.

The pocket rear wall with the extended rear wall section includes a front side, which faces the receiving opening or the receiving compartment, and a rear side, which lies opposite the front side and in particular faces the pocket support.

In particular, in the transfer zone, the front side is arranged facing upwards and the rear side facing downwards with respect to the gravitational direction.

The receiving compartment is arranged at the front side of the pocket rear wall. Accordingly, the receiving compartment is delimited to the rear side by the pocket rear wall. The receiving compartment is delimited at the front side by the pouch wall, which can be pressed together.

The pouch wall together with the pocket rear wall can form a receiving compartment that is only open to the outside through the receiving opening. The pouch wall together with the pocket rear wall however can also form a receiving compartment which is open to the side, as is shown for example in DE 10 2008 061 685 A1.

The extended rear wall section in particular extends at least over the complete width of the receiving compartment.

However, it is also possible for the transport pocket not to form an extended rear wall section. The receiving compartment can therefore also extend over the complete length of the pocket.

In particular, the term "lying" means that the transport pockets in the transfer zone are aligned horizontally or possibly inclined in the conveying direction, in a manner such that the transferred transport item can come to lie on the transport pocket, in particular on the extended rear wall section, outside the receiving compartment.

The lying arrangement of the transport pocket, which is mentioned above, in particular relates to the alignment or inclination of the pocket rear wall in the conveying direction, in particular of the extended rear wall section, of the transport pocket.

In the lying arrangement in the transfer zone, the transport pockets can also form an inclination angle with respect to the horizontal of smaller than 45°, in particular smaller than 20° (angle degrees) and very particularly of smaller than 10°.

In particular, the inclination of the extended rear wall section is of a nature such that the extended rear wall section has a descent from its free end-section towards the receiving opening.

According to a particular embodiment variant, the transport pockets are aligned horizontally in the transfer zone.

In the transfer zone, the receiving compartment is trailing relative to the extended rear wall section considered in the conveying direction. Moreover, in the transfer zone, the receiving compartment is arranged above the pocket rear wall with respect to the gravitational direction. Moreover, in the transfer zone, the receiving opening is aligned in the conveying direction.

In the transfer zone, the transport pockets are arranged successively or one after the other, in particular in a gapless manner. The transport pockets thus in particular form a support (rest) surface which is continuous in the conveying direction, for the transport item to be transferred.

The transport pockets can therefore be arranged end-to end which is to say in an abutting manner in the transfer zone.

According to a particular further development, the transport pockets are arranged overlapping one another in the transfer zone. In this manner, the transport pockets in particular form an imbricate formation. Accordingly, the transport pockets are conveyed or moved through the transfer zone in an imbricate formation.

According to a particular formation of the imbricate formation, the transport pockets lie with a trailing rear wall part over a leading rear wall part of the extended rear wall section of the immediately following transport pocket.

In particular, in the transfer zone, the transport pockets are aligned in the conveying direction.

In this manner, a capture region is formed between the receiving openings of two transport pockets, which are arranged successively in a gapless manner. The capture region then serves for capturing the transport item, which is delivered by the feed device.

The capture region is delimited to the bottom, amongst other things in particular by the extended rear wall section. The extended rear wall section herein forms a mentioned support surface for the transport item.

In this manner, it is ensured that in the transfer zone, the transport item always comes to lie on a transport pocket and cannot fall through between two transport pockets.

The transport pockets are conveyed or moved through the transfer zone in a lying formation on carrying out the method. Hereby, the transport pockets in particular lie on a pocket support.

In the transfer zone, the transport item is delivered from the feed device to the transport pockets. As a characteristic feature, the transport item now is not delivered into the receiving compartments of the transport pockets in a direct manner, but onto a support surface of the transport pocket that is formed by the transport pocket, in particular by the extended rear wall section of the transport pocket.

The transport pockets are moved further, in particular in the transfer conveying direction, during the transfer of the transport item.

In particular, the receiving compartment is in the open position during the transfer of the transport item, i.e. in the transfer zone.

For this, the feed device forms the mentioned delivery region in the transfer zone, at which region the transport item is delivered from the feed device.

The transport pockets are conveyed into the transfer zone below the delivery region in a manner such that the transport item can be delivered from the feed device onto the transport pockets from above, in particular by way of gravity assistance.

As a result, the transport item is fed to the transport pockets and delivered to these from above. Accordingly, after the transfer, the transport item lies on the transport pocket, in particular on the extended rear wall section or on the pouch wall of the transport pocket that runs ahead which is to say which runs in front.

The transfer of the transport item can be effected by way of a guided movement. The transfer of the transport item can also be effected by way of a non-guided movement such as, e.g., a free fall.

The movement path, which is described by the transport item in the delivery region of the feed device, and the conveying path, which is described by the transport pockets in the transfer zone, in particular lie in a common plane.

A lying of the transferred transport item on the transport pocket, in particular on the front side of the extended rear wall section is only possible on account of an inclined or horizontally aligned rear wall section. It is obviously understood that a vertically aligned, extended rear wall section cannot form a support surface for the transport item during a suspended conveying of the transport pocket.

According to a further development of the appliance, the suspended conveying device includes a receiving zone indirectly or immediately subsequent to the transfer zone considered in the conveying direction, in which receiving zone the transport item is received by the receiving compartments of the transport pockets.

The transport pockets are conveyed further in the receiving zone such that the transport item slides into the respective transport pocket by way of gravity.

In particular, the receiving compartment is in the open position in the receiving zone.

In particular, the transport pockets are conveyed or moved in the receiving zone in an inclined manner in the conveying direction. For this, the suspended conveying device in the receiving zone in particular forms a pocket support, on which the transport pockets which are conveyed in an inclined manner lie.

The transport pockets can be brought into a hanging position in the receiving zone, in particularly subsequently to an inclined conveying.

In the receiving zone, the conveying path of the transport pockets in particular runs upwards with respect to the gravitational direction.

In the receiving zone, the inclination of the transport pockets in the conveying direction is selected such that a transport item which is arranged on the transport pocket outside the receiving compartment slides or slips into the receiving compartment, in particular counter to the conveying direction. The transport item herein slides in particular through the receiving opening into the receiving compartment.

The transport item thereby slides into the receiving compartment, in particular over an extended rear wall section. The inclination of the extended rear wall section is consequently of a nature such that the extended rear wall section has a descent from its free end section towards the receiving opening.

The inclination angle in the receiving zone can be 70° (angle degrees) or smaller, in particular 60° or smaller, with respect to the horizontal. The inclination angle in the receiving zone can moreover be 30° or larger, in particular 45° or larger.

In the receiving zone too, the receiving compartment is trailing relative to the extended rear wall section considered in the conveying direction. The receiving compartment is moreover arranged above the pocket rear wall with respect to the gravitational direction. The receiving opening is likewise aligned in the conveying direction.

In particular, the transport pockets are also arranged successively in a gapless manner in the receiving zone. The transport pockets can therefore be arranged subsequently to one another in an abutting manner in the receiving zone.

According to a particular embodiment of the further development, which is mentioned above, the transport pockets are arranged overlapping one another in the receiving zone. In this manner, the transport pockets in particular form an imbricate formation, which has already been described above. Accordingly, the transport pockets are conveyed or moved through the receiving zone in an imbricate formation.

In particular, in the receiving zone, the alignment of the transport pockets is parallel to the conveying direction. Accordingly, the transport pockets are pulled in the conveying direction.

In particular, the receiving zone is immediately subsequent to the transfer zone. In particular, the transfer zone can merge smoothly into the receiving zone, so that the inclination angle of the transport pockets increases directly after the delivery of the transport item.

Basically, it is also conceivable for the transfer zone and the receiving zone to form a common zone. In this case, the transport pockets are already aligned in an inclined manner in the transfer zone, so that the transport items can slide into the receiving compartment immediately after their delivery, on hitting the transport pocket.

In particular, in the transfer zone as well as in the receiving zone, the transport pockets lie with the rear side of their pocket rear wall on the pocket support.

The transport pockets can lie on the pocket support in an extensive manner such as, e.g., over the whole surface. The transport pockets can also lie on the pocket support in sections, such as over part of the surface or in a pointwise manner. A part-surfaced or point-like contact can be effected by way of suitable support means on the transport pocket, such as support rollers or sliding elements.

In particular, the transport pocket lies with a trailing pocket section on the pocket support. Accordingly, the support means can be arranged in a trailing pocket section.

The pocket support can include separate guide elements for supporting the transport pockets. The guide elements can be stationary with respect to the transport pockets. In this case, the guide element serves for the rolling or sliding support of the transport pockets.

The guide elements however can also be co-moved with the transport pockets e.g. via a circulating apparatus.

According to a particular embodiment, the pocket support is formed by conveying members of the respective following transport pockets. The transport pockets can lie on the conveying members in a direct or indirect manner.

In particular, the transport pockets are directly or indirectly supported via the fastening means of the conveying members. It is particularly fastening means which support the resting transport pockets over the whole width which are suitable for this.

In particular, this embodiment can be applied in connection with the formation of an imbricate formation of the transport pockets. It has the great advantage that no separate support elements need to be provided.

According to a further development of the transport pocket, the extended rear wall section additionally has the function of a carrying section. The fastening means according to this further development in particular are arranged on the extended rear wall section, in particular on the free end section of the extended rear wall section.

In particular, the fastening means is arranged in a leading manner with respect to the receiving compartment, particularly given an inclined or lying conveying.

In particular, the fastening means includes a fastening element, via which the transport pocket can be fastened to the conveying member, in particular in a releasable manner. The fastening element can be designed, e.g., for hanging the transport pocket onto the conveying member.

The fastening element can thus, e.g., be an eyelet, via which the transport pocket is hung on the conveying member. The fastening element can also be a hook, via which the transport pocket is hung on the conveying member.

A further aspect of the invention moreover relates to a transport pocket for an appliance, which is described above.

The transport pocket includes a receiving compartment with a receiving opening, a pocket rear wall and a fastening means for connecting the transport pocket to a conveying member of the suspended conveying device.

According to a further development of the invention, the transport pocket in its open position has a rear wall section, which is extended beyond the receiving opening.

The extended rear wall section in particular serves for forming a deposit surface for the transport item to be transferred into the transport pocket.

The length of the extended rear wall section in the open position of the transport pocket in particular is at least a quarter of the height or receiving depth of the receiving compartment. The length of the extended rear wall section can also correspond to at least a third or at least half the height or receiving depth of the receiving compartment. The height or receiving depth of the receiving compartment corresponds to the distance between the pocket base and the receiving opening.

The receiving compartment in particular is designed in a manner such that this can assume an open position and a space-saving compact position.

In the open position, the receiving compartment is expanded and the receiving opening is open. The receiving compartment forms a receiving space for receiving a transport item.

In the compact position, the receiving compartment is pressed together or compressed, e.g. folded together, in a space saving manner and accordingly does not form a receiving space or a reduced receiving space.

For this, the pouch wall can be designed in a partly or completely flexible manner. In particular, the pouch wall can be foldable.

The walls of the transport pocket, in particular the pouch wall can consist of a textile sheet formation such as fabric or contain this.

In particular, the pocket rear wall and in particular the extended rear wall section are designed in an intrinsically stable manner.

The pocket rear wall in particular has such a sufficient stiffness, in order, in the horizontal position, to be able to form a stable imbricate formation without a large-surfaced support from below.

The transport pocket can further include opening means, via which the receiving compartment can be moved into the open position or be held in this, in particular counter to the gravitational force.

The opening means can include restoring means on the transport pocket, said restoring means, by way of a restoring force which counteracts gravitational force, ensuring that the receiving compartment is opened and held in the open position without the action of a counter-force such as a pressing pressure, which counteracts the restoring force.

The restoring elements for example can be spring-elastic elements such as spring steel elements that act upon the walls of the receiving compartment. These elements for example can press the pouch wall away from the pocket rear wall.

The opening means can also include a holding-open element such as e.g. a pivotable bow, on the transport pocket, the element bringing the transport pocket into an open position or holding it in this, by way of the intrinsic weight.

The opening means can also include a holding-open element, such as e.g. a pivotable bow, on the transport pocket, said element holding the transport pocket in an open position by way of a mechanical fixation, such as latching position or hooking position. The functions of the two holding-open elements, which are mentioned above, can also be combined.

It is moreover possible for the openings means on the transport pocket to interact with an activation means of the suspended conveying device, in order to bring the transport pocket into the open position or to hold it in this.

The opening means can thus include a cam element such as a cam roller, on the transport pocket, the element interacting with an activation means that is designed as a cam guide.

In particular, the cam guide is stationary with respect to the transport pockets.

The cam element can be arranged, e.g., on the pouch wall of the transport pocket.

The cam guide effects a positional change of the cam roller and accordingly of the pouch wall relative to the pocket rear wall and this leads to an opening of the transport pocket.

The activation means can also include a magnet, which exerts a magnetic force upon the magnetic opening means, such as metal bow and thus brings the transport pocket into an open position or holds it in this.

According to a further development of the transport pocket, this in the extended rear wall section includes at least one and in particular several through-openings. In particular, the through-openings are holes. The holes can form a hole pattern.

The at least one through-opening serves for optically examining whether the conveyed item is still arranged on the rear wall section or is located in the receiving compartment. The optical examination, which is effected subsequently to the receiving zone, can be effected by the eye or in an automated manner by way of optoelectronic sensor means, which detect the light passage through the at least one through-opening.

Should an irregularity be ascertained with this optical examination, e.g. if the conveyed item is not completely stowed in the receiving compartment, then the respective transport pocket can be ejected (diverted) out of the conveying stream via an ejecting device.

Furthermore, a read device for reading out product data from a data carrier, which is arranged on the transport item or on the transport pocket, can be arranged subsequently to the receiving zone or to the optoelectronic sensor means, which are mentioned above.

As mentioned, the transport pocket can include support means (rest means), such as sliding elements or support rollers, for the sliding or rolling support of the transport pocket along a pocket support. The support means can be arranged, e.g., on the pocket rear wall, in particular on its rear side. The support means can be arranged laterally of the transport pocket considered in the conveying direction.

The suspended conveying device is designed for the suspended, in particular freely suspended conveying of the transport pockets. In particular, the suspended conveying device is designed for the individual, suspended conveying of transport pockets. I.e., the transport pockets are also conveyed in a suspended or freely suspended manner outside the transfer zone and receiving zone.

The term "individual" means that the transport pockets are not directly connected to one another, e.g. not interlinked.

In particular, the transport pockets are also led individually through the transfer zone and receiving zone.

The transfer pockets can therefore be conveyed further in an individually suspended manner subsequently to the receiving zone after the transport goods have slipped into the receiving compartments of the transport pockets.

The conveying members likewise include fastening means for fastening, in particular for releasably fastening the transport pockets to the conveying member. The fastening means can be fastening bodies. Considered in the conveying direction, these can include fastening arms that lead away laterally and via which the transport pockets are fastened to the conveying member.

The fastening means of the conveying members and transport pockets can be designed such that these permit a pivoting of the transport pocket relative to the conveying member.

The conveying members can be carriages that are rollingly guided along at least one guide rail via runner rollers.

In particular, the carriages are designed as individual carriages. This permits the individual conveying of the transport pockets. The carriages can be designed as outer runners or inner runners.

The suspended conveying device however can also be a chain conveyor, concerning which the conveying members are fastened to a driven conveying chain.

The feed device can be designed to feed the transport item/items to the delivery region in a singularised or portioned manner. Hereby, the transport item is transferred to the individual transport pockets in each case in a singularised or portioned manner.

The feed device can be a belt conveyor. The transport item is accordingly fed to the delivery region on a conveying belt. The delivery region can be arranged at a deflecting location of the conveying belt, at which location the conveying belt is deflected downwards.

Delimitation elements such as transverse or separating strips (bars) can be arranged on the conveying surface of the conveying belt, said limitation elements subdividing the conveying belt into individual, open compartments that permit the singularised or portioned conveying of the transport item/items. The transport items, which are conveyed to the delivery region in the compartments, are envisaged for delivery to one transport pocket in each case. I.e., the transport item of a compartment is transferred to an individual transport pocket.

In particular, the feed device and the suspended conveying device are operated in a cyclically synchronous manner to one another in the transfer zone. Accordingly, the compartments of the conveying belt and the transport pockets are moved cyclically synchronously to one another into the transfer zone.

The transport item can be bulk goods such as powder, granulate, small parts (e.g. screws), etc. The transport item, however, in particular includes piece items (piece goods), i.e., individual discrete objects. These objects can be household articles, sport articles, clothes, shoes etc.

The appliance according to the invention is designed in particular to charge transport pockets with individual piece items.

For this, in particular the piece items are fed individually from the feed device to the transfer zone. The piece items can therefore be fed individually to the delivery region in compartments of the belt conveyor described above.

The piece items for example can be singularised and fed to the feed device in a manual manner. The piece items can be individually filled into the compartments of the belt conveyor by the personnel.

A read device can be provided, the read device reading out information from data carriers of the piece items on transfer of the piece items to the feed device.

The read device can be e.g. an optoelectronic read device that reads out a bar code or a 2D code, such as QR code.

The read device can also be designed for reading out RFID tags on the piece items.

The reading of the product information on transfer of the transport items to the feed device amongst other things serves for tracking the flow of the items.

The described appliance has the advantage that the transport item no longer needs to be transported through the receiving opening of the receiving compartment by the feed device with a high precision on delivery to the suspended conveying device.

The transport item is not received by the receiving compartments of the transport pockets until in a subsequent step after its delivery to the suspended conveying device.

The delivery of the transport item from the feed device onto the suspended conveying device therefore permits greater tolerances, since the transport item does not need to be moved through the receiving opening in a precise manner on its delivery. Accordingly, the transport item can also be transferred in the transfer region at higher speeds, i.e. cycle rates.

The use of the transport pocket, which is disclosed in the present description, is not restricted to the presence of a feed device as well as to the particular design of the delivery region and of the transfer zone as are likewise disclosed in the present description. In contrast, the transport pocket is suitable for application in every type of suspended conveying device, concerning which transport items are transported in transport pockets in a suspended manner.

According to a further development of the transport pocket, the at least one cam element is arranged in the region of the receiving opening. The at least one cam element can be arranged for example in the region of the edge termination of the receiving opening.

As mentioned, the at least one cam element can be a cam roller. The geometric rotation axis of the cam roller is orientated transversely to the conveying direction.

However, the at least one cam element can also be a sliding element. The sliding element can be, e.g., a stub or pin. The sliding element in particular can be a sliding bush.

In particular, the transport pocket includes two cam elements that are arranged on the pouch wall. In particular, the cam elements are arranged laterally of the pouch wall considered in the conveying direction. In particular, the cam elements project laterally from the pouch wall considered in the conveying direction.

In particular, the cam elements are arranged on the pouch wall in a manner distanced to one another transversely to the conveying direction.

The two cam elements can be connected to one another via a connecting element.

In particular, the connecting element is designed in a rigid manner.

The connecting element can be a connecting rod or a connecting bar, e.g., of metal or plastic.

The connecting element can form a free end towards the cam elements in each case, on which free ends a cam element is arranged. If the cam elements are cam rollers, then these in particular are rotatably mounted on the free end of the connecting element.

The connecting element can also serve for laterally stretching out the pouch wall in the region of the receiving opening.

The connecting element can moreover form part of the enclosure or the edge termination of the receiving opening.

The connecting element can be led through a receiving loop, which is formed on the pouch wall, and be held on the pouch wall in this manner.

The receiving loop in particular forms at least one section of the edge termination of the receiving opening.

In an embodiment, the receiving opening is designed in a frameless manner. This means that the receiving opening of the transport pocket in particular is not enclosed by a closed frame design.

Indeed, the complete transport pocket can be designed in a frameless manner.

According to an embodiment, the receiving opening can be encompassed or framed by a closed bow.

According to an embodiment, the receiving opening can be framed by an open bow. The bow, also called opening bow is particularly characterised by a multi-dimensional shaping. The bow can be U-shaped or C-shaped.

In particular, the bow is designed open towards the pocket rear wall.

In particular, the cam element or cam elements are arranged on the bow.

The bow can be arranged exclusively on the pouch wall. In particular, the bow is not connected directly to the pocket rear wall. This means that the bow at the most is indirectly connected to the pocket rear wall via the pouch wall.

However, the bow can also be connected to the pocket rear wall.

However, in particular, the bow is not directly connected to the fastening means. In particular, the fastening means is not part of the bow.

The bow can be led through at least one loop in the pouch wall.

According to another embodiment, the receiving opening is designed in a bowless manner. This means that the receiving opening of the transport pocket in particular is not framed by an open or closed bow.

In particular, the at least one cam element is connected to the pocket rear wall exclusively via the pouch wall.

In particular only or exclusively a wall section of the pouch wall is arranged between the cam element and the pocket rear wall.

In particular, the pocket rear wall has such as sufficient stiffness that this does not deform under gravitational influence in an inclined or horizontal position.

In particular, the pocket rear wall can consist of a plate element.

The pouch wall can consist of several pocket walls. The pouch wall can thus include a pocket base, lateral, in particular two laterally arranged pocket walls as well as a front wall, which lies opposite the pocket rear wall.

The pocket walls can be intrinsically stable.

"Intrinsically stable", also called "shape-stable" in the context of the pocket walls or the pocket rear wall within the scope of the invention in particular means that the pocket wall or the pocket rear wall also retain their shape given a change of the position of the transport pocket.

The individual pocket walls in particular are movably connected to one another, e.g., in a hinge-like manner. The pocket walls can be pivoted relative to one another about a pivot axis along their connection. In particular, the pocket walls form fold axes along their movable connection, so that the pouch wall can be folded together accordingly.

The pouch wall can consist of—in particular shape-stable—plate elements. In particular, the above-mentioned pocket walls can consist of individual plate elements. As mentioned above, the plate elements can be movably connected to one another, e.g. in a hinge-like manner.

The pouch wall can be constructed in a single-part or multi-part manner. Concerning a construction of several parts, the pocket walls consist of individual plate elements which are connected to one another e.g. along their fold axes.

According to a particular embodiment variant, the pouch wall and the pocket rear wall are constructed in a single-part manner.

With regard to a single-part construction, the pouch wall or the pouch wall and the pocket rear wall consist of a single plate. The individual pocket walls are shaped by way of bending or creasing the plate along bend axes or crease axes. The bend axes or crease axes in particular can form fold axes, along which the wall elements can be folded together. Accordingly, hinge-like connections are formed at the bend axes or crease axes.

The plate elements or the plate can be manufactured from a plastic. The plate elements or the plate can be formed from a composite material.

The plate elements or the plate can be sandwich plates, including two cover layers and a plate core lying therebetween. In particular, the plate elements or the plate can be present as hollow chamber plates, according to which the plate core forms hollow chambers.

The hollow chambers in the plate core can run or being orientated parallel or transversely to the plate surface. The plate core can be e.g. a honeycomb core.

The thickness of the plate elements or of the plate can be 1 to 10 mm, in particular 2 to 5 mm.

In the compact position, the receiving compartment in particular forms no receiving opening or a receiving opening of a smaller size than in the open position.

In the compact position, the receiving opening in particular is closed or in particular is at least partly closed. In the open position, the receiving opening in particular is open or in particular at least partly open.

Compact position in particular means that the receiving opening is not situated in filling position, in which the transport pocket can be filled with the transport item through the receiving opening. In contrast, the open position in particular means that the receiving opening is situated in a filling position.

The receiving opening in particular is directed upwards in the hanging position of the transport pocket. This means that the receiving compartment is open to the top in the hanging position.

In particular, the fastening means is connected to the pocket rear wall or is arranged on this. In particular, the fastening means is connected to the extended rear wall section or arranged on this.

The suspended conveying device, which is disclosed in the present description—in particular in combination with the conveying members, the guide rail and the cam guide—is likewise not restricted to the presence of a feed device as well as to the particular embodiment of the delivery region and of the transfer zone as are likewise disclosed in the present description.

The transport pockets are very generally applied in a suspended conveying device for the suspended conveying of transport items. This device includes a plurality of conveying members, which are movable in a conveying direction along a conveying path and on which the transport pockets are arranged or fastened.

As already mentioned, the conveying members are moved in particular along guide rails that define the conveying path.

The suspended conveying device now includes at least one cam guide that cooperates with the cam element in a manner such that this cam guide effects a positional change of the cam element and accordingly of the pouch wall relative to the pocket rear wall. This procedure again effects the opening of the transport pocket.

The cam guide in particular a link guide, e.g., in the form of a link rail. The link guide in particular forms a guide surface for the cam element. In the case of a cam element designed as a cam roller, the guide surface is accordingly a rolling surface. In the case of a cam element designed as a sliding element, the guide surface is accordingly a sliding surface.

The cam elements in particular are positively guided by the cam guide. This positive guidance is designed such that this activates the positional change, which has been described above, and therefore the opening of the transport pocket.

The cam guide or the positive guidance, which is effected by the cam guide, can therefore be designed such that this holds the receiving opening in the open position subsequently to the opening procedure, e.g. for the purpose of filling the transport pocket.

The opening of the transport pockets, which are described above, and which are conveyed along the conveying path of the suspended conveying device, which is described above is, characterised by the following steps:
  the conveying of the transport pockets into an opening zone of the suspended conveying device;
  the interaction of the at least one cam guide with the at least one cam element of the transport pocket and by way of this
  carrying out a positional change of the at least one cam element and accordingly of the pouch wall relative to the pocket rear wall and by way of this
  opening the transport pocket.

The opening of the transport pocket, which is described above, in particular is effected in a suspended or at least partly suspended position of the transport pocket.

In particular, the positional change is characterised by a lifting of the at least one cam element relative to the pocket rear wall. The transport pocket or the associated receiving compartment assumes an open position due to this.

In particular, a possibly present connecting element is also lifted together with the cam element.

The positional change can also include a movement of the at least one cam element away from the pocket rear wall. A combination of the two movements, which are mentioned above, is likewise possible.

According to an embodiment of the invention, the positional change, which is activated by the interaction of the at least one cam guide with the at least one cam element, describes a movement path which does not have the shape of a circular arc.

This is particularly the case if the at least one cam roller is not connected to the pocket rear wall via a rigid element, such as an opening bow.

According to this embodiment, the at least one cam roller is connected to the pocket rear wall in particular via the pouch wall.

According to an embodiment of the invention, the positional change of the at least one cam element and accordingly of the pouch wall relative to the pocket rear wall is a pivoting movement about a geometric pivot axis, which is arranged on the transport pocket, and in particular on the pocket rear wall.

This is particularly the case if the at least one cam roller is connected to the pocket rear wall via a rigid element such as an opening bow, wherein the rigid element is pivotably mounted on the pocket rear wall about a geometric pivot axis.

The interaction of the at least one cam guide with the at least one cam element of the transport pocket can effect a further positional change of the at least one cam element together with the pouch wall and the pocket rear wall relative to the conveying member.

The positional change of the at least one cam element relative to the pocket rear wall and the further positional change of the at least one cam element together with the pouch wall and the pocket rear wall relative to the conveying member can be sequential or superimposed.

According to a further development of this embodiment variant, the interaction of the at least one cam guide with the at least one cam element of the transport pocket activates a pivoting movement of the pouch wall together with the pocket rear wall and in particular of the transport pocket, about a geometric pivot axis, which is arranged outside the pouch wall, and the pocket rear wall, in particular outside the transport pocket.

In this case, the interaction of the at least one cam guide with the at least one cam element of the transport pocket effects a position change of the at least one cam element together with the pouch wall and the pocket rear wall, and in particular together with the transport pocket, relative to the conveying member.

The at least one cam element thus can be pivoted about a, as described above, geometric pivot axis, which is arranged on the pocket rear wall, as well as about a further geometric pivot axis, which is arranged outside the pouch wall and the pocket rear wall, in particular outside the transport pocket.

The pivoting movements about the two mentioned geometric pivot axes can be sequential. However, the pivot movements about the two mentioned geometric pivot axes can also be superimposed.

The guide surface of the at least one cam guide can include an ascent, which in particular effects a lifting of the at least one cam element relative to the pocket rear wall.

Partly suspended position in particular means that at least a part of the weight of the transport pocket is carried by the conveying member. The transport pocket can therefore be supported from below in the partly suspended position.

Moreover, partly suspended can also mean that the transport pocket assumes an inclined position.

The transport pocket can now be conveyed with: leading pouch wall in the conveying direction, or with trailing pouch wall in the conveying direction.

In this context, it is also possible for the transport pockets in the suspended conveying device to be able to be conveyed along a conveying path in a first conveying direction as well as a second conveying direction which is directed opposite to the first conveying direction.

BRIEF DESCRIPTION OF THE DRAWINGS

The subject-matter of the invention is hereinafter explained in more detail by way of embodiment examples, which are represented in the accompanying figures. Shown schematically in each case are:

FIG. 6b a perspective view of the transport pocket according to FIG. 6a;

DETAILED DESCRIPTION OF THE INVENTION

Figure 1:
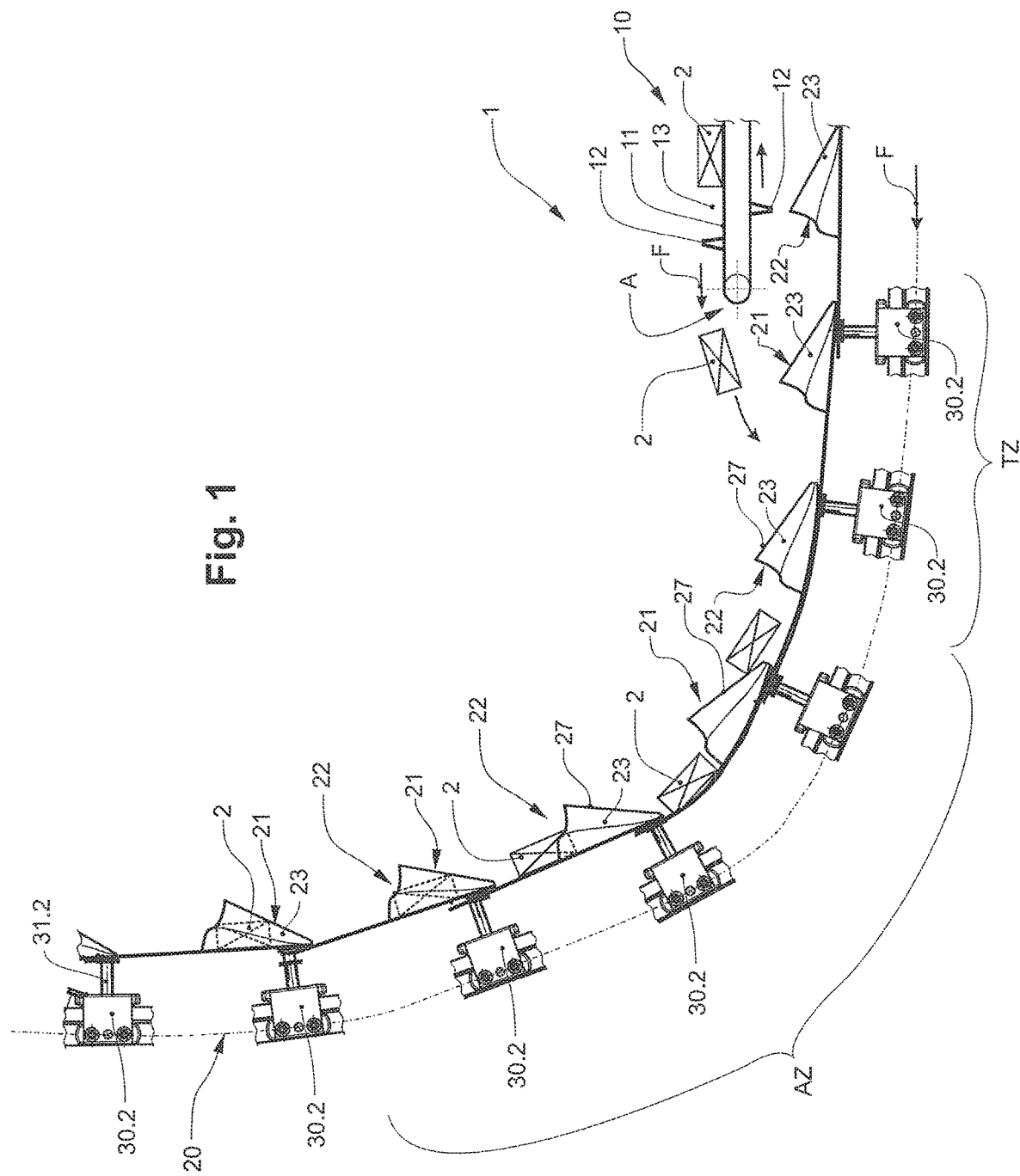
FIG. 1 a lateral view of a first embodiment of an appliance according to the invention, in the region of the transfer zone.
Figure 2:
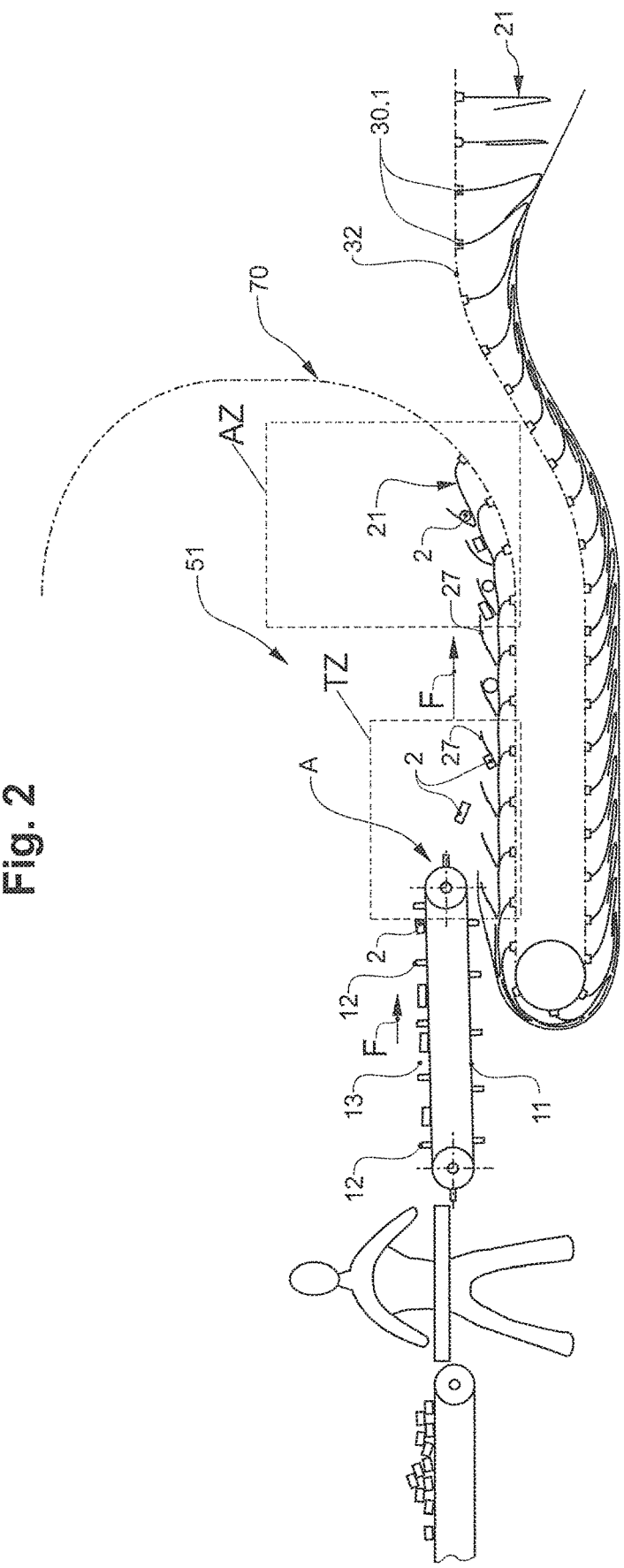
FIG. 2 a lateral view of a second embodiment of an appliance according to the invention, in the region of the transfer zone.

The appliances 1, 51 according to the two embodiments according to FIGS. 1 and 2 are designed for the transport or conveying of piece items 2. In the appliances 1, 51 according to both embodiments, the piece items 2 are fed to the transfer zone TZ by way of a belt conveyor 10. The conveying belt 11 of the belt conveyor 10 is designed as a compartmental belt and includes transverse strips 12, which in the conveying direction F subdivide the conveying belt 11 into individual compartments 13.

An individual piece item 2 is conveyed to the transfer zone TZ per compartment 13. The belt conveyor 10 forms a delivery region A at the entry to the transfer zone TZ, in which delivery region the piece items 2 are delivered from the compartments 13. In the delivery region A, the compartmental belt 11 is led into a deflection and deflected downwards. In this manner, the piece items in the transfer zone TZ drop downwards from the compartmental belt 11 on account of gravity.

The suspended conveying device 20, 70 includes a plurality of transport pockets 21, which are each fastened to a carriage 30.1, 30.2. The carriages 30.1, 30.2 are individually led along a guide rail 32 via rollers.

The transport pockets 21 each from a receiving compartment 23 for receiving the piece items 2. The receiving compartment 23 is delimited to the rear side by a pocket rear wall 24 and to the front side by a pouch wall 27. The receiving compartment 23 moreover forms a receiving opening 22.

Figure 3A:
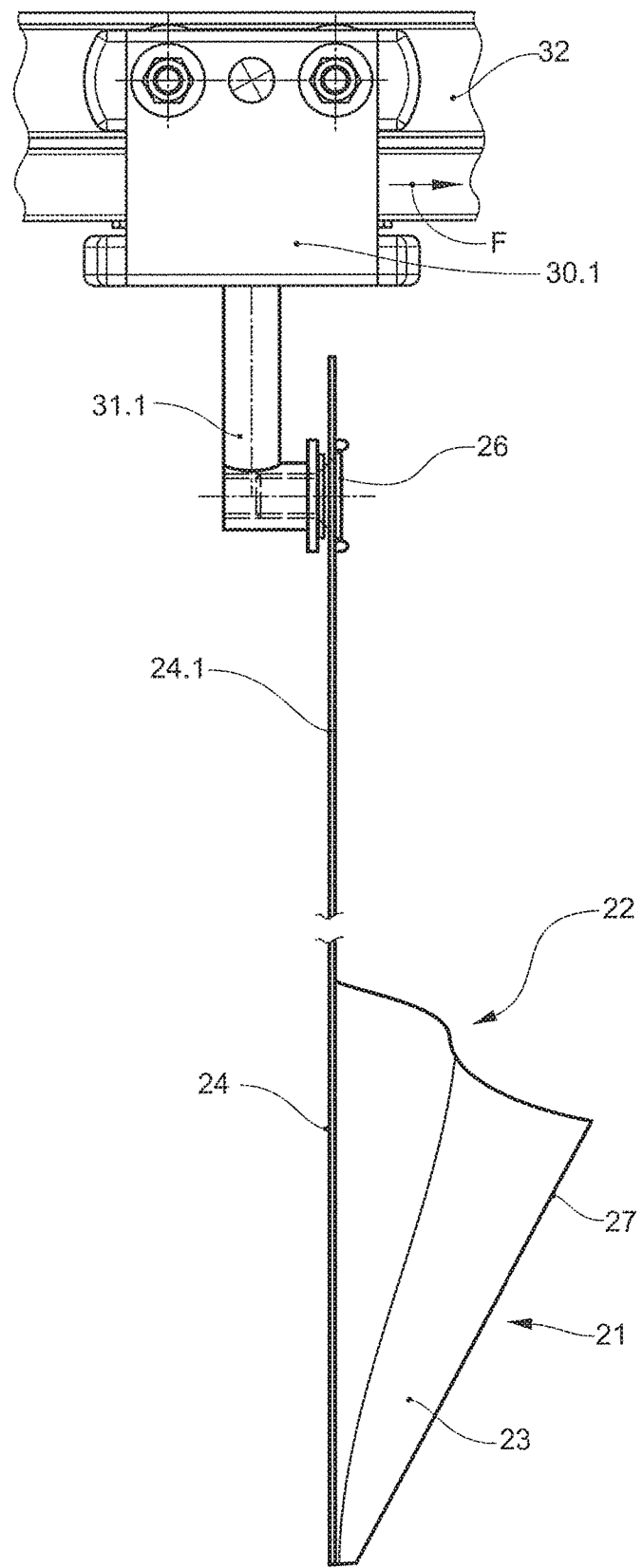
FIG. 3a a lateral view of a first embodiment of a transport pocket with a conveying member.
Figure 3B:
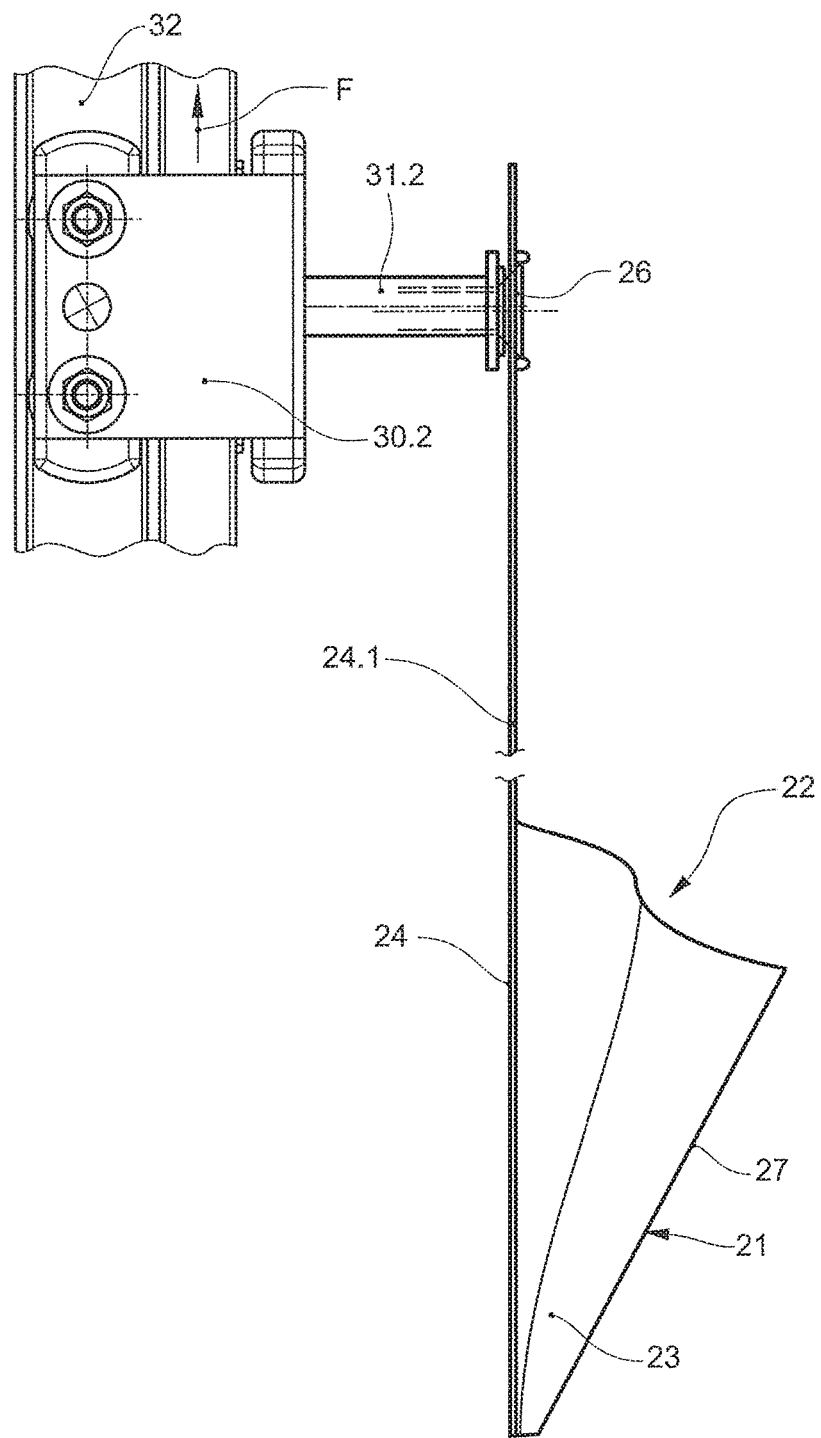
FIG. 3b a lateral view of the transport pocket according to FIG. 3a with a further embodiment of a conveying member.
Figure 4A:
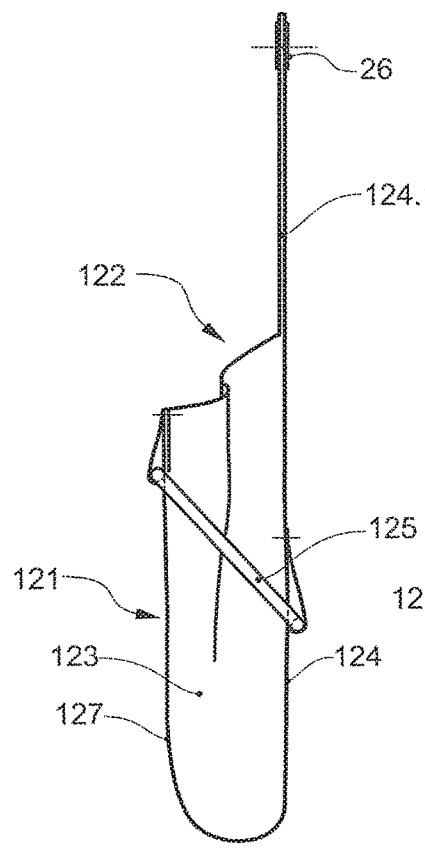
FIGS. 4a-4c a lateral view of a further embodiment of a transport pocket.
Figure 4B:
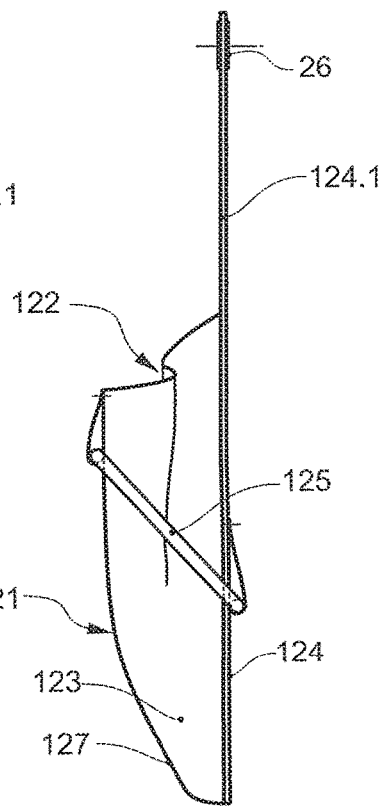
Figure 4C:
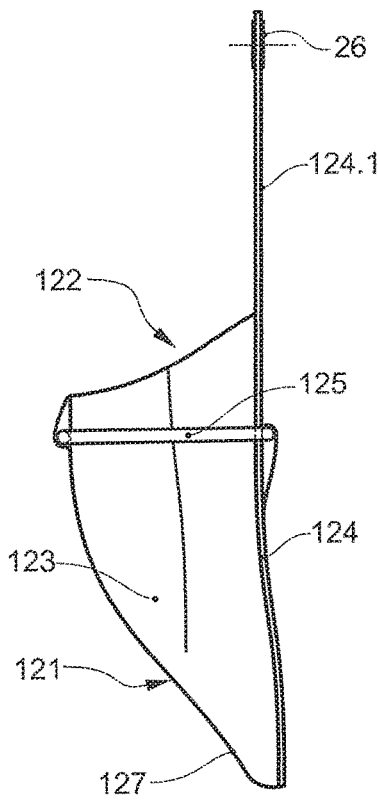

The transport pockets 21 furthermore each form an extended rear wall section 24.1. Holding eyelets 26 for fastening the transport pockets 21 to the conveying member 30.2 are attached to the free end section of the extended rear wall section 24.1. The receiving compartment 23 is open to the side of the extended rear wall section 24.1 (see also FIGS. 3a and 3b).

The carriages 30.1, 30.2 each include a fastening body 31.1, 31.2 for fastening the transport pocket 21 to the carriage 30.1, 30.2.

According to the embodiment according to FIG. 1, the fastening of the transport pocket 21 is designed such that its pocket rear wall 24 is aligned in the conveying direction F. The transport pockets 21 are now conveyed in imbricate formation and in the horizontal position below the delivery region A into the transfer zone TZ.

According to the embodiment according to FIG. 2, the fastening of the transport pocket 21 is designed such that its pocket rear wall 24 is aligned transversely to the conveying direction F. The transport pockets 21 are therefore bent at the extended rear wall section 24.1 into an alignment parallel to the conveying direction F, in particular in the transfer zone TZ which is yet described hereinafter and in the receiving zone AZ.

According to this embodiment, the transport pockets 21 are fed from below along the deflection and in the horizontal position are conveyed into the transfer zone TZ below the delivery region A amid the formation of an imbricate formation.

According to both embodiments, a trailing rear wall part of the transport pocket 21 lies on a leading rear wall part of the extended rear wall section 24.1 of the immediately following transport pocket 21, in the imbricate formation.

A capture region is now formed between the receiving openings 22 of two adjacent transport pockets 21, wherein the extended rear wall section 24.1 forms a rest surface for the piece item 2.

The piece items 2, which in the delivery region A are delivered from the feed device 10, on account of gravity now drop onto the transport pockets 21, which are conveyed with an imbricate formation past and below the delivery region A, or fall into the capture regions, which are formed by the transport pockets 21 in imbricate formation.

The piece items 2 in particular fall onto the extended rear wall section 42.1 of the transport pockets 21. However, it is also possible for the piece goods 2 to drop partly or completely onto the pouch wall 27 of a respective transport pocket 21 that runs in front. In this context, it is however important for a piece item 2, which is to be transported into a certain transport pocket 21, not to fall onto the transport pocket 21 in front of the receiving opening 22 of the transport pocket 21, which runs in front considered in the conveying direction F. In such a case, the piece item 2 would indeed be transported into the transport pocket 21, which runs in front.

The feed device 10 and the suspended conveying device 20, 70 are operated cyclically synchronously to one another, so that the piece items 2 fall into the correct capture regions and are finally transported into the correct receiving compartments 23 of the transport pockets 21.

The compartments 13 of the conveying belt 11, for example, therefore have the same length in the conveying direction F as the capture regions of the imbricate formation of the transport pockets 21. The compartment length or length of the capture regions can, e.g., be 500 mm. The conveying belt 11 and the transport pockets 21 can be moved at the same conveying speed in the transfer zone TZ due to this.

The suspended conveying device 20, 70 forms a receiving zone AZ subsequently to the transfer zone TZ. The transport pockets 21 continue to be conveyed in an imbricate formation in the receiving zone AZ, wherein here too the extended rear wall section 24.1 forms a support surface for the piece item 2. The transport pocket 21 and in particular the extended rear wall section 24.1 however is inclined in the receiving zone AZ and forms a descent towards the receiving opening 23.

The piece item 2 in the receiving zone AZ now slides over the extended rear wall section 24.1 into the receiving compartment 23 of the associated transport pocket 21. If the piece item 2 lies on the pouch wall 27 of the running-ahead transport pocket 21, then this item firstly slips from the pouch wall 27 onto the extended rear wall section 24.1 of the subsequent transport pocket 21 and over this into the receiving compartment 23 of the trailing transport pocket 21.

In their horizontal or inclined position, which the transport pockets 21 assume in the transfer zone TZ and receiving zone AZ, these transport pockets are supported from below by a pocket support. The pocket support is formed by the conveying members 30.1, 30.2 themselves. I.e., the transport pockets 21 are each supported by the conveying members 30.1, 30.1 of the following transport pockets 21 or by their fastening bodies 31.1, 31.2. For this, the transport pockets 21 lie with a trailing pocket section on the conveying member 30.1, 30.2.

The transport pockets 21 with the piece items 2 in their receiving compartments 23 can be conveyed further in a suspended manner subsequently to the receiving zone AZ.

The transport pockets 121, 221, 321, 421, 521, 621 according to the FIGS. 4a-4d, 5, 6a-6b, 7, 8 and 9 each form a receiving compartment 123, 223, 323, 423, 523, 623 for receiving the piece items 2. The receiving compartment 123, 223, 323, 423, 523, 623 is delimited towards the rear side by a pocket rear wall 124, 224, 324, 424, 524, 624 and towards the front side by a pouch wall 127, 227, 327, 427, 527, 627. The receiving compartment 123, 223, 323, 423, 523 623 moreover forms a receiving opening 122, 222, 322, 422, 522, 622.

The transport pocket 121, 221, 321, 421, 521, 621 moreover forms an extended rear wall section 124.1, 224.1, 324.1, 424.1, 524.1, 624.1. Holding eyelets 126, 226, 326, 426, 526, 626 for fastening the transport pocket 121, 221, 321, 421, 521, 621 to a conveying member 30.2 are attached to the free end section of the extended rear wall section 124.1, 224.1, 324.1, 424.1, 524.1, 624.1. The receiving compartment 123, 223, 323, 423, 523, 623 is open to the side of the extended rear wall section 124.1, 224.1, 324.1, 424.1, 524.1, 624.1.

The transport pocket 121 according to the embodiment variant according to FIG. 4a-4d includes an opening bow 125, which on account of its intrinsic weight as well as a mechanical fixation, keeps the transport pocket 121 open in the open position.

Figure 5:
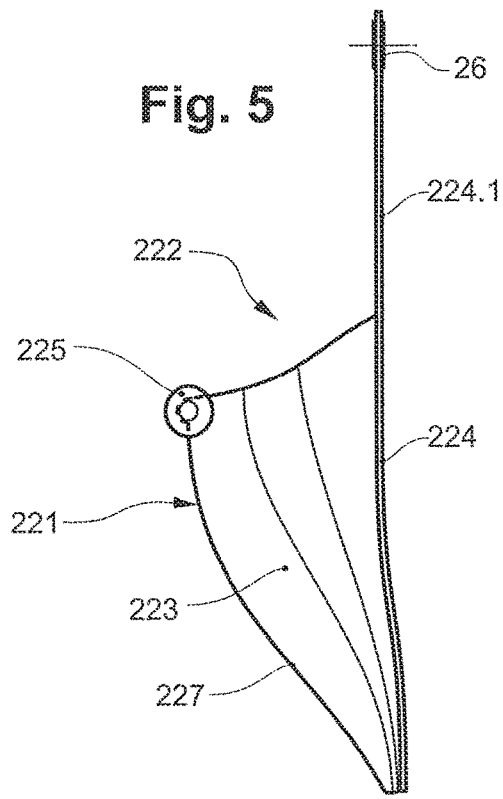
FIG. 5 a lateral view of a further embodiment of a transport pocket.
Figure 9:
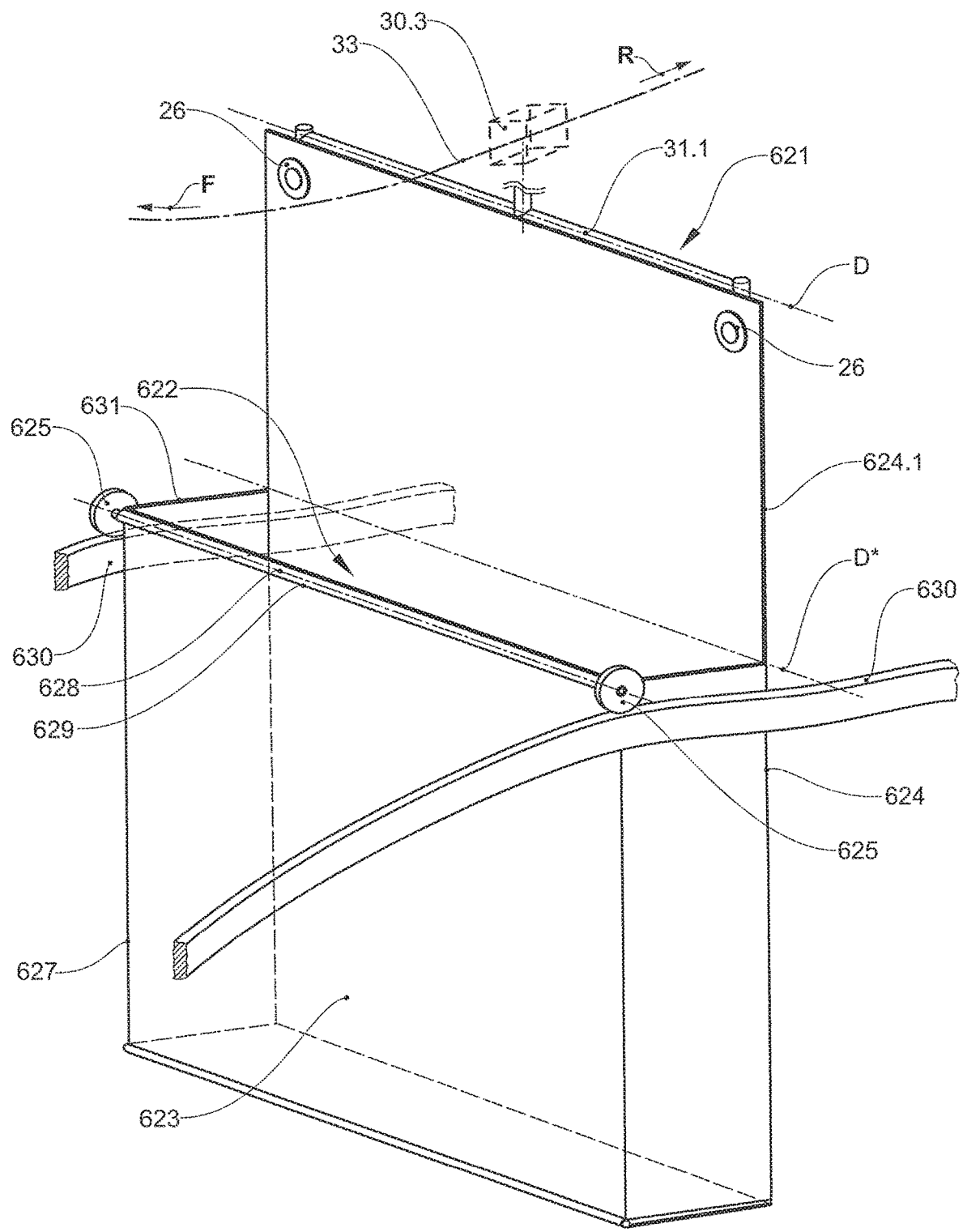
FIG. 9 a perspective view of a further embodiment of a transport pocket.

The transport pocket 221 according to the embodiment variants according to FIGS. 5 and 9 includes a cam roller 225, 625 on the pouch wall 227, 628 in the region of the receiving opening 222, 622, said cam roller interacting with a stationary cam guide 630 in the suspended conveying device (not shown in FIG. 5). The receiving compartment 223, 623 is moved into an opened position or into a compact position depending on the position of the cam roller 225, 625 along the cam guide 630.

Figure 6A:
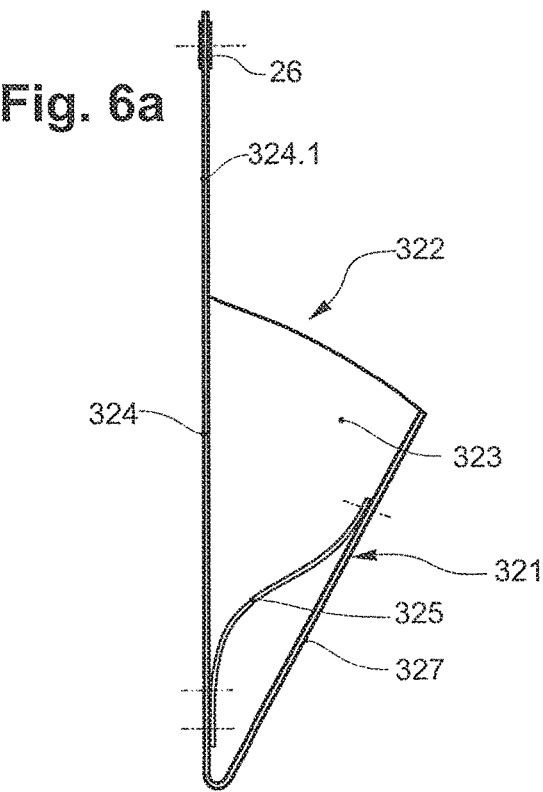
FIG. 6a a lateral view of a further embodiment of a transport pocket.
Figure 4D:
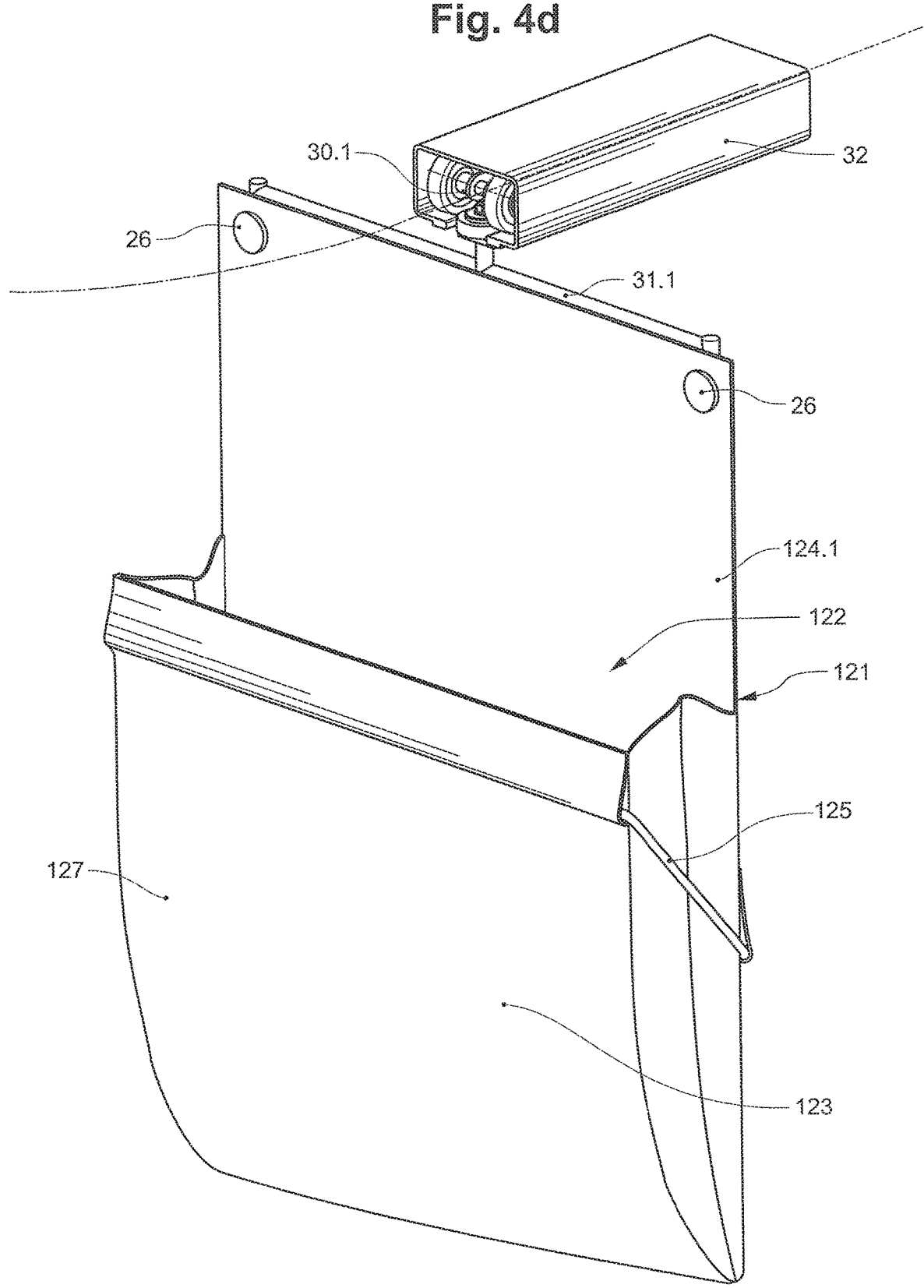
FIG. 4d a perspective view of the transport pocket according to FIG. 4a-4c.
Figure 6B:
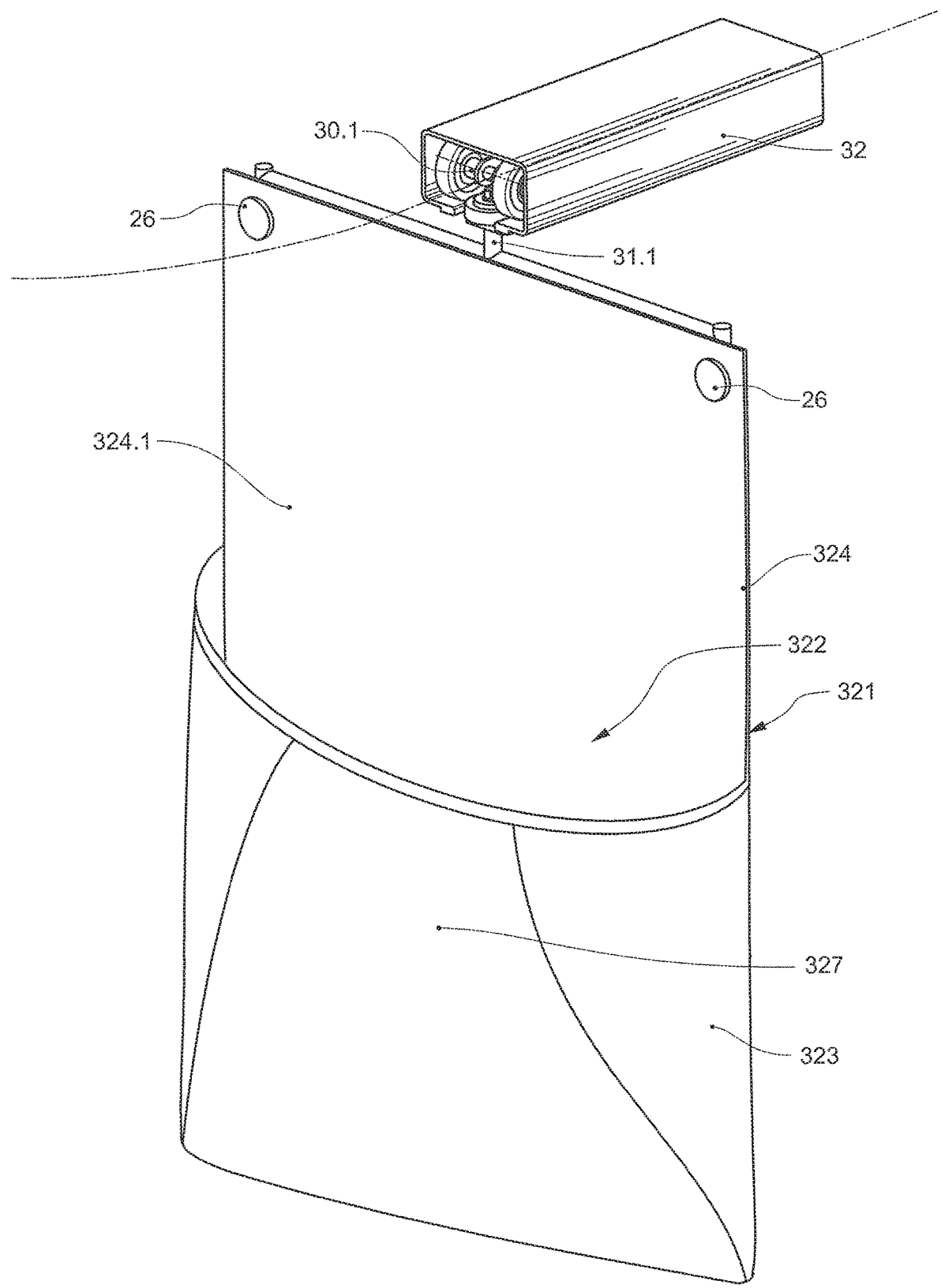

The transport pocket 321 according to the embodiment variant according to FIGS. 6a-6b includes a spring steel element 325 in the receiving compartment 323, the element pressing the pouch wall 327 into the opened position on account of its restoring force. The compact position is achieved by way of applying a counter-force, e.g. by way of a contact pressure.

Figure 7:
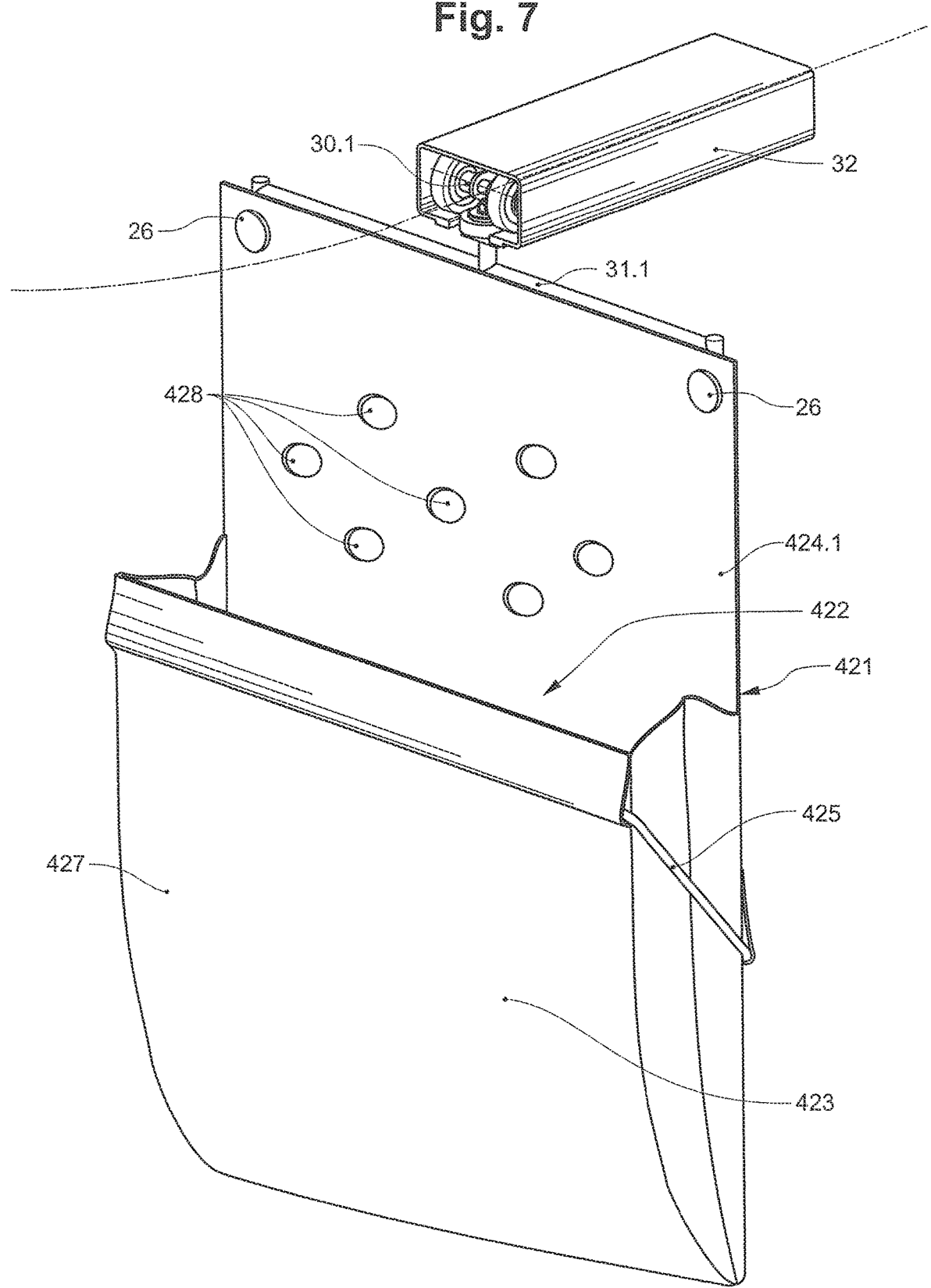
FIG. 7 a perspective view of a further embodiment of a transport pocket.

FIG. 7 shows a transport pocket 427 according to FIG. 4a-4d, however with the difference that the transport pocket 427 in the extended rear wall section 424.1 includes a hole pattern with a plurality of holes 428. These serve for examining whether the piece items 2 in the receiving zone AZ have actually slipped into the receiving compartments 423.

Figure 8:
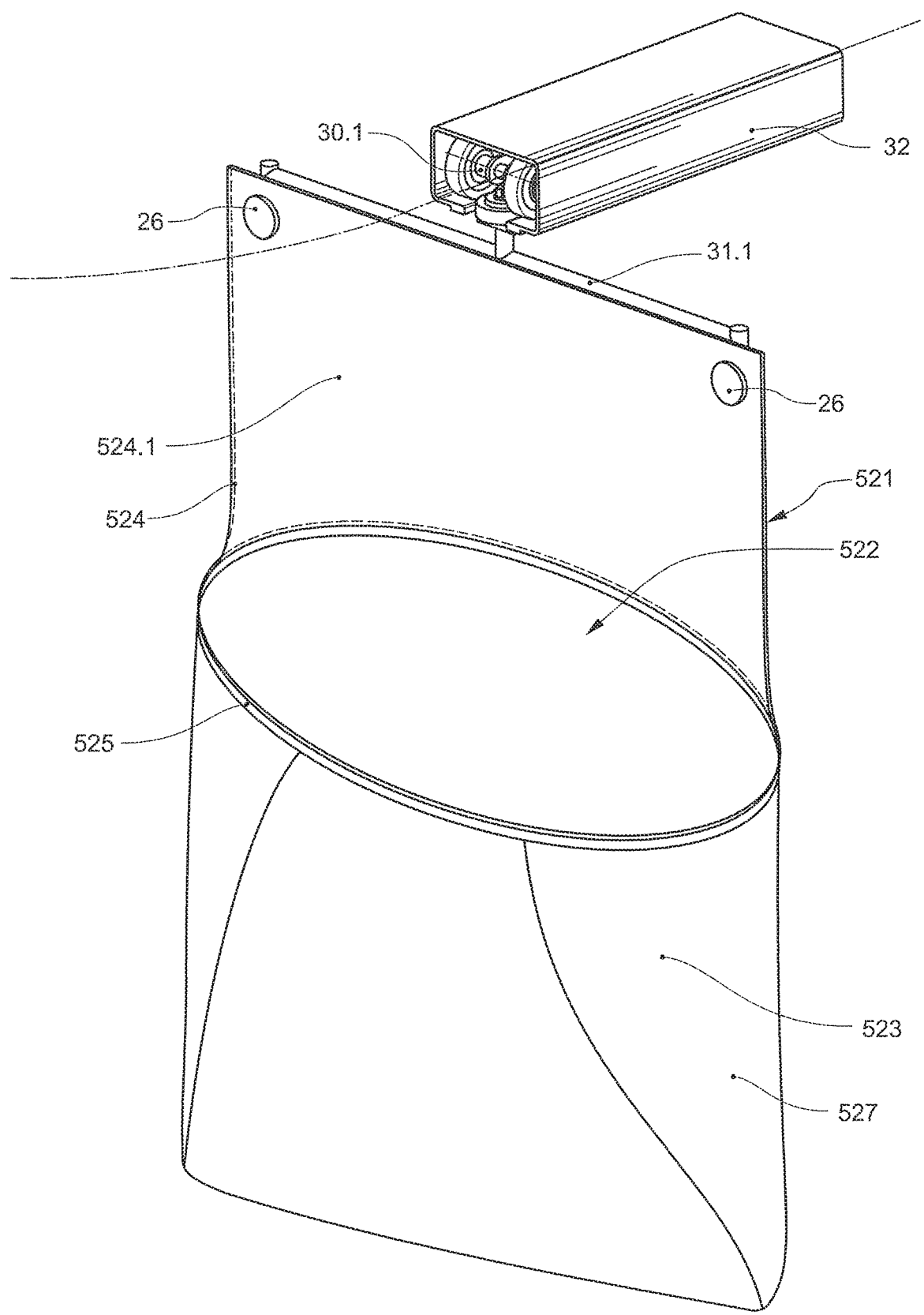
FIG. 8 a perspective view of a further embodiment of a transport pocket.

The transport pocket 521 according to the embodiment variant according to FIG. 8 includes a strip-like restoring element 525, which encompasses the receiving opening 522 and presses the receiving opening 522 into the open position or holds it in the open position on account of its restoring force. The restoring element 525 has spring-elastic characteristics. The restoring element 525 can be, e.g., a plastic strip or a spring steel strip.

The compact position is achieved by way of applying a counter-force, e.g., by way of a contact pressure.

The pouch wall 627 of the transport pocket 621 according to the embodiment according to FIG. 9 includes several pocket walls. The pouch wall 627 thus includes a pocket base, two laterally arranged pocket walls as well as a front wall which lies opposite the pocket rear wall 624.

The transport pocket 621 moreover includes two cam rollers 625 that are spaced from one another transversely to the conveying direction F, R and that are arranged on the pouch wall 627. The cam rollers 625 are connected to one another via a connecting rod 628 and are rotatably mounted at their free ends. The connecting rod 628 is led through a receiving loop 629, which is arranged on the pouch wall in the region of the receiving opening 622. The connecting rod 628 apart from holding the cam rollers 625 also serves for stretching out the pouch wall 627.

The connecting rod 628 and the associated receiving loop 629 form a section of the edge termination 631 of the receiving opening 622.

Basically, the embodiment variant according to FIG. 5 can likewise include the features described above.

The embodiment variant according to FIG. 6 as well as according to FIG. 5 include holding eyelets 26 in the extended rear wall section, for attaching a fastening body 31.1 (only shown in FIG. 6) for the purpose of creating a connection to a conveying member 30.3 which can be e.g. a carriage.

The cam guides 630 form rolling surfaces for the cam rollers 625, along which the cam rollers 625 roll for opening the transport pocket 621. The cam rollers 625 are herein positively guided by the cam guides 625. This positive guidance is designed such that this effects a position change of the cam rollers 625 and accordingly of the pouch wall 627 relative to the pocket rear wall 624 and, by way of this, an opening of the transport pocket 621. The position change in the present embodiment example includes a lifting of the cam rollers 625 relative to the pocket rear wall 624.

On lifting the cam rollers 625, these pivot together with the connecting rod 628 about a geometric pivot axis D* which is arranged in the pocket rear wall 624.

The cam guide can moreover be designed such that the cam rollers 625, in particular subsequent to the lifting of the cam rollers 625, together with the connecting rod 628, the pouch wall 627 and the pocket rear wall 624, in particular together with the transport pocket 621 pivot relative to the conveying member 30.3 about a pivot axis D.

The transport pocket 621 according to the present embodiment example can moreover be conveyed along a conveying path 33 in a first conveying direction F as well as in a second conveying direction R, which is directed opposite to the first conveying direction F.

The transport pockets which are shown in the present figures are merely exemplary. Other design variants of transport pockets, e.g., those without an extended rear wall section are likewise possible.

The invention claimed is:

1. A suspended conveying device for suspended conveyance of transport items, said suspended conveying device comprising a plurality of carriages, each of said carriages carrying a transport pocket and being individually movable in a conveying direction along a guide rail for individual conveyance of the transport pocket, wherein the transport pocket is arranged on the carriage for suspended transport of a transport item along the conveying direction, said transport pocket comprises a pocket rear wall and a pouch wall that, together with the pocket rear wall, form a receiving compartment for the transport item, and the receiving compartment defines a receiving opening through which the transport item is inserted into the receiving compartment, said pouch wall being flexible such that said transport pocket can assume an open position and a space-saving compact position, further comprising a fastener for connecting the transport pocket to one of the plurality of carriages, as well as comprising at least one cam element that can interact with an activation device of the suspended conveying device, which is designed as a cam guide, and via which cam guide the receiving compartment can be moved into or held in the open position wherein the at least one cam element is arranged on the pouch wall of the transport pocket.

2. The suspended conveying device according to claim 1, wherein the receiving compartment can be moved into the open position or be held in the open position, counter to gravitation force, via the at least one cam element.

3. The suspended conveying device according to claim 1, wherein the at least one cam element is a cam roller.

4. The suspended conveying device according to claim 1, wherein the transport pocket, in its open position, forms a rear wall section that is extended beyond the receiving opening.

5. The suspended conveying device according to claim 1, wherein the extended rear wall section acts as a carrying section.

6. The suspended conveying device according to claim 1, wherein the fastener is arranged on the pocket rear wall.

7. The suspended conveying device according to claim 1, wherein the transport pocket comprises two cam elements that are arranged laterally of the transport pocket, when considered in the conveying direction.

8. The suspended conveying device according to claim 7, wherein the cam elements are connected to one another via a connecting element.

9. The suspended conveying device according to claim 8, wherein the connecting element is led through a receiving loop, which is formed on the pouch wall.

10. The suspended conveying device according to claim 8, wherein the connecting element is selected from the group consisting of:
    a connecting rod;
    an open bow; and,
    a closed bow.

11. The suspended conveying device according to claim 1, wherein the transport pocket is designed in a frameless manner.

12. The suspended conveying device according to claim 1, wherein the at least one cam element is connected to the pocket rear wall exclusively via the pouch wall.

13. The suspended conveying device according to claim 1, wherein the cam guide can interact with the at least one cam element in a manner such that the cam guide effects a position change of the at least one cam element and accordingly of the pouch wall relative to the pocket rear wall, which leads to an opening of the transport pocket.

14. A method for opening transport pockets that are conveyed along the guide rail of the suspended conveying device according to claim 1, comprising the steps of:
    conveying the transport pockets into an opening zone of the suspended conveying device;
    interacting of the cam guide with the at least one cam element of the transport pocket, and by way of this interaction:
    carrying out a positional change of the at least one cam element and accordingly of the pouch wall relative to the pocket rear wall, and thereby
    opening the transport pocket.

15. The method according to claim 14, wherein the transport pocket is conveyed with:
    the leading pouch wall in the conveying direction or with the trailing pouch wall in the conveying direction.

16. The method according to claim 14, wherein the positional change of the at least one cam element relative to the pocket rear wall includes a pivoting movement about a geometric pivot axis, which is arranged on the transport pocket.

17. The method according to claim 14, wherein the positional change, which is activated by the interaction of the cam guide with the at least one cam element, describes movement path that does not have the shape of a circular arc.

18. The method according to claim 14, wherein the interaction of the cam guide with the at least one cam element of the transport pocket effects a further positional change of the at least one cam element together with the pouch wall and the pocket rear wall relative to the carriage.

* * * * *